United States Patent [19]

Lang et al.

[11] Patent Number: 4,728,066

[45] **Date of Patent: * Mar. 1, 1988**

[54] COLLAPSIBLE TRIANGULATED TENSION SUPPORT STRUCTURE

[76] Inventors: Donald Lang, 382 Franklin St., Cambridge, Mass. 02139; Joseph S. Shortlidge, 132 Bay State Rd., Melrose, Mass. 02176

[ * ] Notice: The portion of the term of this patent subsequent to Dec. 30, 2003 has been disclaimed.

[21] Appl. No.: 947,048

[22] Filed: Dec. 29, 1986

Related U.S. Application Data

[63] Continuation-in-part of Ser. No. 695,906, Jan. 29, 1985, Pat. No. 4,632,344.

[51] Int. Cl.[4] .............................................. F16M 11/32

[52] U.S. Cl. .................................... 248/165; 108/111; 182/182; 211/186; 211/189

[58] Field of Search .................... 248/188.91, 165, 166, 248/440; 211/187, 186, 189, 190, 195; 52/657, 695, 40; 182/182; 297/441; 108/111

[56] References Cited

U.S. PATENT DOCUMENTS

| | | | |
|---|---|---|---|
| 1,172,355 | 2/1916 | Guest | 248/165 X |
| 1,256,279 | 2/1918 | Wanamaker | 248/166 |
| 1,931,118 | 10/1933 | Rowland | 248/165 |
| 2,081,602 | 5/1937 | Rubenstein | 248/127 X |
| 2,186,484 | 1/1940 | Gunther | 182/182 X |
| 2,550,793 | 5/1951 | Ferriera | 248/163 X |
| 2,589,269 | 3/1952 | Magnuson et al. | 211/186 X |
| 2,724,511 | 11/1955 | Morgan | 211/181 X |
| 2,794,496 | 6/1957 | Strand, Jr. | 248/165 |
| 3,303,936 | 2/1967 | Barnawell | 211/187 X |
| 3,384,332 | 5/1968 | Fenner et al. | 248/165 |
| 3,934,676 | 1/1976 | Rice | 182/182 |
| 3,967,327 | 7/1976 | Severson | 211/195 X |
| 4,331,312 | 5/1982 | La Voe | 248/165 X |
| 4,354,437 | 10/1982 | Logan | 248/188.91 X |
| 4,415,150 | 11/1983 | Iezza | 248/165 X |

OTHER PUBLICATIONS

Hughes Bulletin #15, "Type C 1077 Tangent Structure", 1948.

*Primary Examiner*—J. Franklin Foss
*Assistant Examiner*—David L. Talbott
*Attorney, Agent, or Firm*—Richard J. Birch

[57] ABSTRACT

A collapsible triangulated tension support structure having a generally H-shaped planar configuration. Two vertical members are connected to a horizontal compression member and flexible diagonally crossed tension members extend from one vertical member to the other below the compression member. An upper tension member is connected to both vertical members at points located above the horizontal compression member so that tensioning of the upper tensioning member spreads apart the portions of the vertical members located below the horizontal compression member thereby putting the diagonally crossed tension members under tension. Alternatively, tension can be applied to one or both of the diagonally crossed tension members so that the portions of the vertical members located above the horizontal compression member are spread apart. Other tensioning configurations also are disclosed. At least one horizontal shelf bracket is connected to and extends outwardly from the upper portion of each vertical member to define a supporting surface for electronic apparatus. The structure can be collapsed for transportation by moving the vertical members together in an adjacent configuration.

16 Claims, 8 Drawing Figures

34
24
24
26
28
28
22
22
30
32
80
84
82

32
84
82

24
24
82
26a
26b
28
28
26
22
22
30
32

61
34
63
24
24

COLLAPSIBLE TRIANGULATED TENSION SUPPORT STRUCTURE

CROSS-REFERENCE TO RELATED APPLICATION

The present application is a Continuation-in-Part Application of our copending application Ser. No. 695,906, filed Jan. 29, 1985 now U.S. Pat. No. 4,632,344, the subject matter of which is incorporated herein by reference.

BACKGROUND OF THE INVENTION

The present invention relates to support structures in general, and more particularly, to a collapsible triangulated tension support structure.

Musical groups travel from engagement to engagement with a variety of musical instruments and associated equipment. For example, many groups use microphones, mixers, amplifiers, equalizers, speakers and other electronic equipment during their performances. In addition to conventional musical instruments, electronically synthesized music has become an integral part of many musical performances. Electronic music synthesizers typically include one or more keyboards to provide a variety of electronically created sounds. During a performance, the synthesizer keyboards must be firmly supported at a convenient height for the musician. Since travel, set-ups and take-downs are almost a mandatory concomitant of today's musical scene, providing a suitable support surface for keyboard type electronic synthesizers presents a major problem.

It is accordingly a general object of the present invention to provide a collapsible triangulated tension support structure.

It is a specific object of the invention to provide such a structure that is easily set up before a performance and taken down after a performance.

It is another object of the invention that the structural elements while under tension after assembly provide a lightweight, yet rigid, structure and support surface.

It is a feature of the invention that the support structure can be collapsed into a relatively small package without sacrificing the rigidity and strength of the structure when it is assembled.

It is another feature of the invention that the height of the support surface or surfaces can be varied to accomodate a musician's preference without sacrificing the strength of the tension support structure.

BRIEF DESCRIPTION OF THE INVENTION

The collapsible tension support structure of the present invention utilizes two upright members or lever arms connected to a horizontal compression member to form a generally H-shaped planar structure. Two flexible tension members extend in diagonally crossed X-shaped pattern from one lever arm to the other and vice versa. The two tension members are located below the horizontal compression member. An upper tension member extends between and is connected to the upper portions of the two lever arms. By tensioning the upper tension member, the lower portions of the lever arms are spread apart and the two flexible diagonally crossed tension members are put in tension. Alternatively, one or both diagonally crossed tension members can be tensioned so that the upper portions of the lever arms are spread apart and the upper tension member is placed in tension. Each lever arm or upright has a triangular-shaped leg lying in a plane substantially normal to the plane of the H-shaped structure. At least one shelf bracket or other support is connected to and extends outwardly from each lever arm above the horizontal compression member. The two shelf brackets form a support surface for an electronic musical instrument or other apparatus. Optionally, two vertical tension members connect the shelf brackets to the corresponding triangular-shaped legs of the collapsible tension support structure.

DESCRIPTION OF THE DRAWINGS

The objects and features of the invention set forth above and other objects and features can best be understood from a detailed description of a preferred embodiment of the invention selected for purposes of illustration and shown in the accompanying drawings in which.

DETAILED DESCRIPTION OF THE INVENTION

Figure 1:
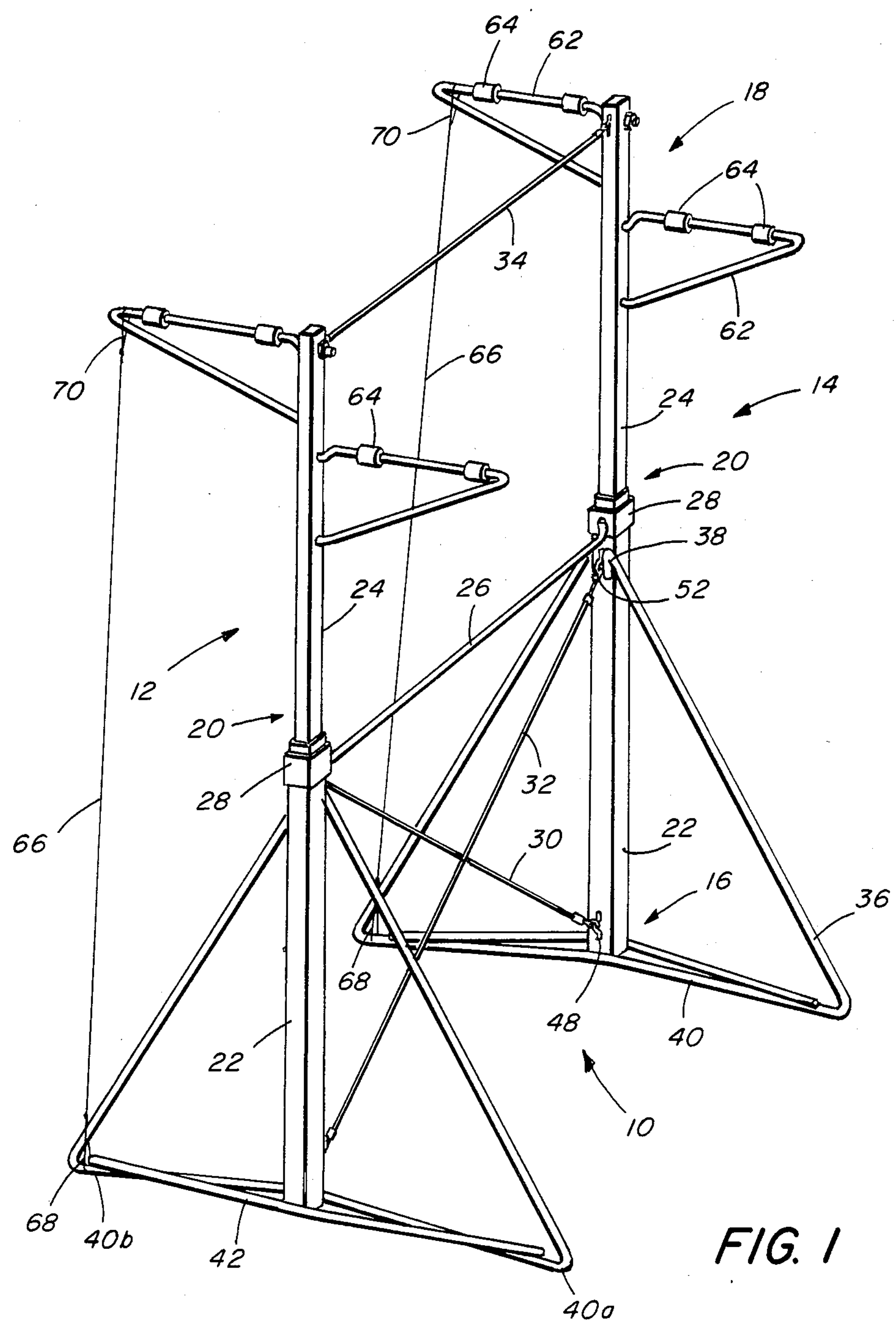
FIG. 1 is a perspective view of the support structure showing the optional two vertical tension members.

Turning now to the drawings, and particularly to FIG. 1 thereof, there is shown in perspective view a collapsible tension structure constructed in accordance with the present invention and indicated generally by the reference numeral 10. The reference numerals used in FIG. 1 correspond where possible to the reference numerals used in our copending application to identify the same components.

The tension structure 10 comprises two uprights indicated generally as 12 and 14, each of which has a base portion 16, an upper end portion 18 and an intermediate portion 20. In the preferred embodiment, the uprights or lever arms 12 and 14 are formed from two telescoping nested tubes; a lower tube 22 and an upper tube 24. Extending between the uprights 12 and 14 is a horizontal compression member 26 that is connected to the uprights by means of collars 28 that are secured to the horizontal compression member 26.

Diagonally crossed tension members 30 and 32 extend from the intermediate portion 20 of one upright to the base portion 16 of the other upright. An upper tension member 34 extends between and is connected to the upper end portions 18 of the two uprights 12 and 14. Thus, by tensioning member 34, as will be described below, the base portions 16 of the upright members 12 and 14 will be spread apart putting tension members 30 and 32 under tension.

It will be appreciated at this point in the description of the invention that the uprights 12 and 14, horizontal compression member 26, tension members 30 an 32 and the adjustable tension member 34 form a generally H-shaped planar structure. As shown in FIG. 1, the plane of this generally H-shaped structure has been depicted as though it were at 60-degrees to the plane of the drawing.

Each upright has a triangular leg 36 with an apex 38 and a base 40. The base 40 is secured to the base portion 16 of the corresponding upright. In addition, for maximum stability, a strut 42 also is secured to the base portion of each upright and to the tip portions **40*a* and 40*b* of the triangular leg 36**. Each triangular leg lies in a plane substantially normal to the plane of the H-shaped planar structure.

The tension members 30 and 32 are preferably formed from flexible wire cable and are secured to wire cable anchors 48 located on each upright. The flexible tension cables 30 and 32 each have a swaged cable loop 50 formed at the ends thereof. Connection of the wire cable loops 50 to the cable anchors 48 is provided through S-hooks 52.

Figure 2:
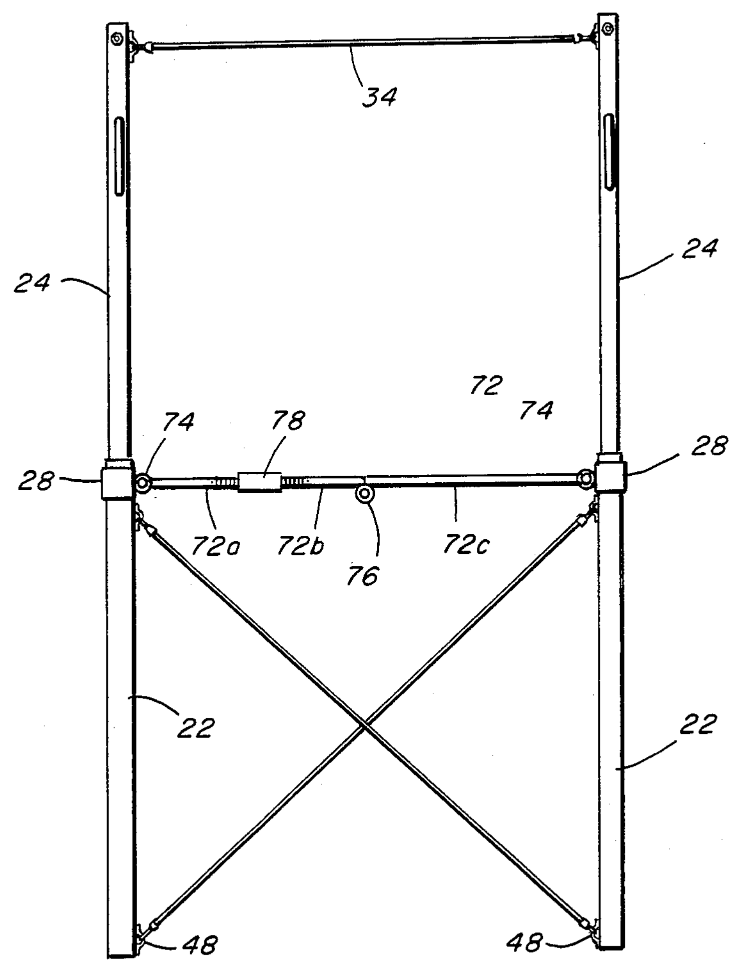
FIG. 2 is a view in front elevation of the support structure with the triangular legs removed for purposes of clarity and illustrating the adjustable length, hinged horizontal member.
Figure 3:
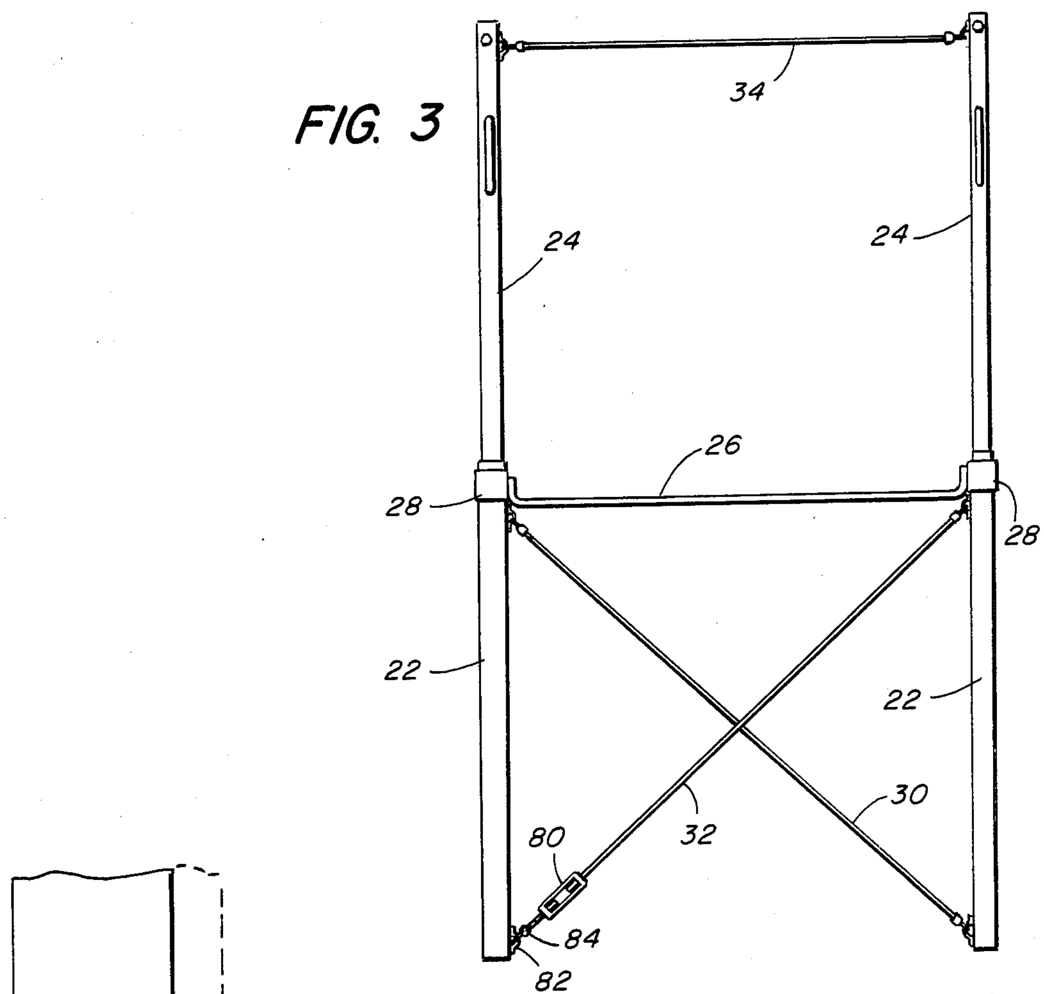
FIG. 3 is another view in front elevation showing the use of a turnbuckle to place one of the diagonally crossed tension members in tension.
Figure 4:
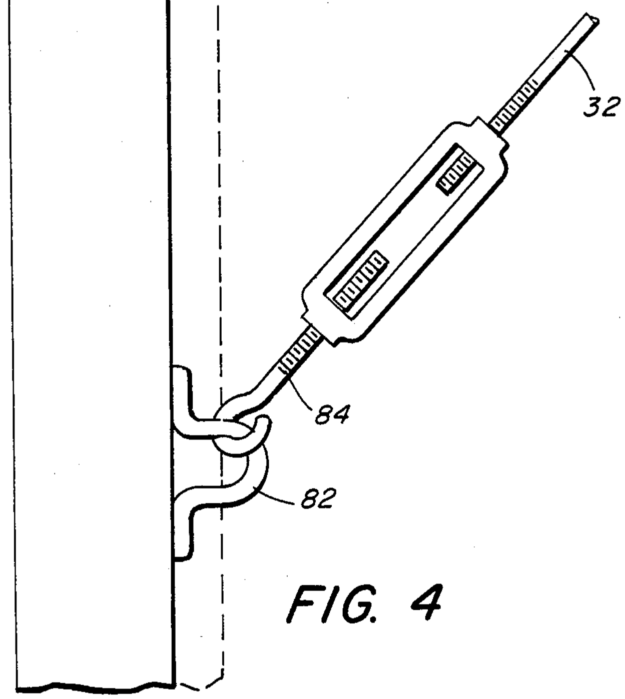
FIG. 4 is another view in front elevation showing in detail the turnbuckle arrangement illustrated in FIG. 3.
Figure 5:
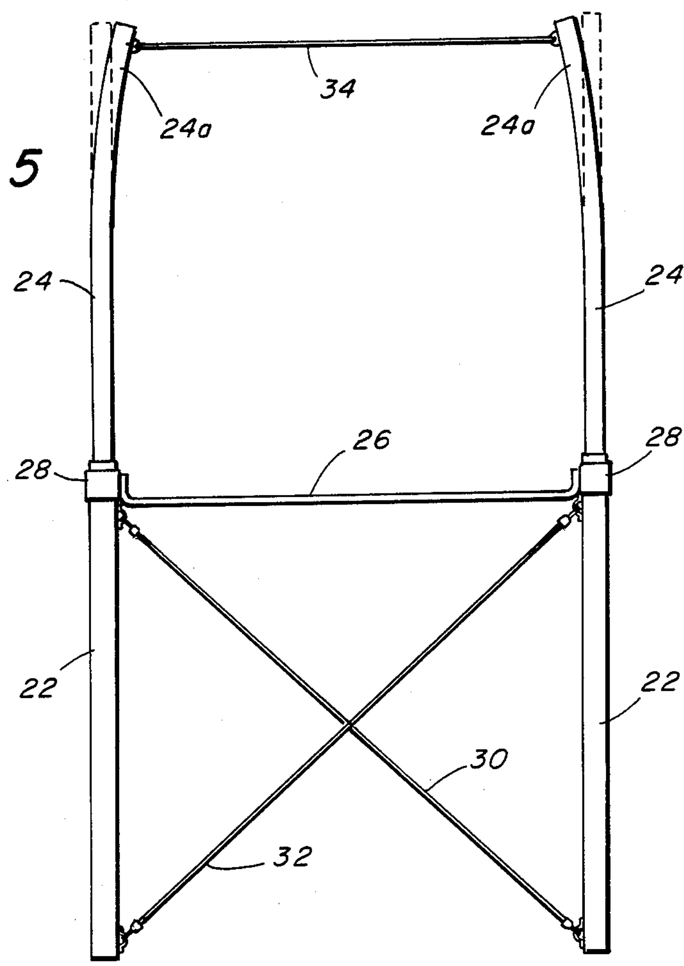
FIG. 5 is a view in front elevation showing the use of a fixed length upper tensioning member in conjunction with the springing of the upper portions of the two upright members.
Figure 6:
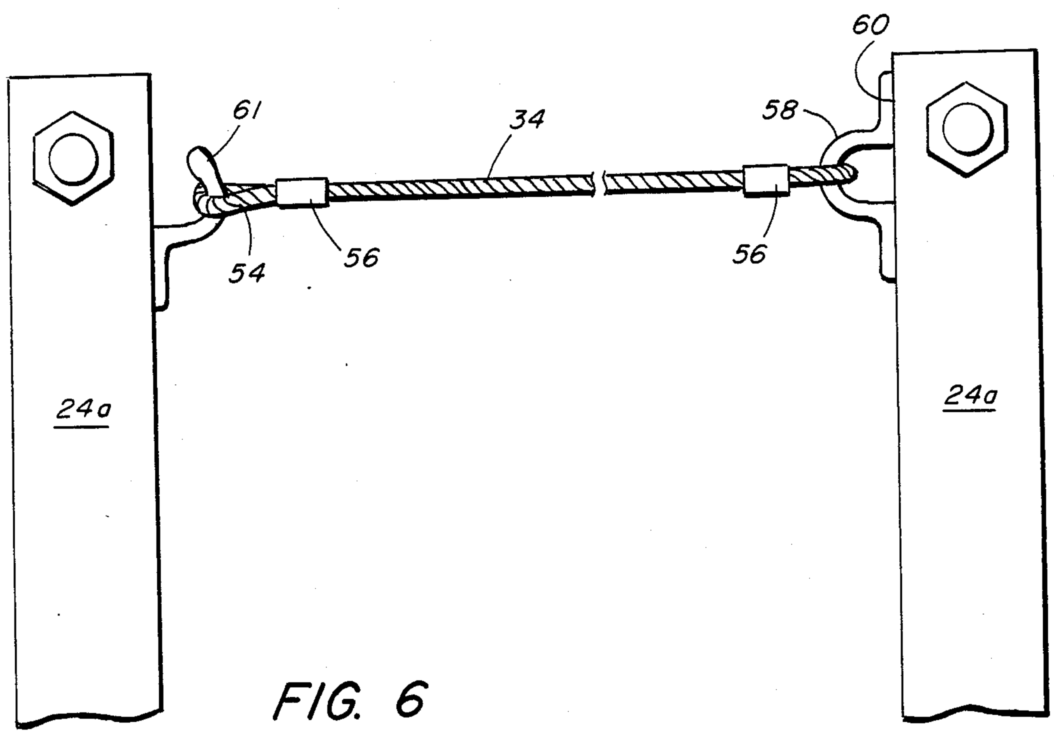
FIG. 6 is a view in detail of the upper portion of the upright structure shown in FIG. 5.

Referring to FIGS. 1 through 6, the upper tension member 34 can be either fixed or removably connected to at least one of the uprights. FIGS. 1, 2 and 3 show the fixed connection while FIGS. 5, 6, 7 and 8 illustrate the removable connection. The tension member 34 is formed from a flexible cable having swaged end loops 54 secured by fasteners 56. The right hand loop 54, as viewed in FIG. 6, is connected to a bracket 58 which is secured to the right hand upright member 24 as viewed in FIG. 6 by weldment 60. The left hand loop of tension member 34 is looped over a hook 61 mounted on the left hand upright tube 24. Given this configuration, it can be seen that the tension exerted by tension member 34 upon the two upright nested tubes 24 can be varied as a function of the length of tension member 34. This length can be adjusted as described in our copending application using an eye-bolt weld nut arrangement (not shown herein) or by preselecting the length of member 34 and utilizing the elasticity ("springiness") of the upright member 24 to place tension member 34 under tension or by using a tensioning spring 63 as shown in FIG. 8.

It will be appreciated that while the tension between the upper tubes 24 draws the tubes closer together, the base portions 16 (the lower ends of lower tubes 22) are spread apart thereby putting the flexible tension members 30 and 32 under tension. At this point, the collapsible tension support 10 provides a rigid structure for any electronic component or other apparatus that may be placed on a support, such as, triangular shelf brackets 62 that are connected to and extend outwardly from the upper tubes 24 as seen in FIG. 1.

Preferably, each shelf bracket 62 has one or more rubber or plastic collars 64 that provide a non-skid surface for and protect the bottom surface of any electronic apparatus placed on the shelf brackets.

Additional rigidity to the assembled tension support structure 10 can be achieved by means of vertical tensioning members 66 as shown in FIG. 1. The tensioning members 66 are looped over the triangular legs 36 using loops 68 formed thereon and over the shelf brackets 62 by corresponding loops 70. By selecting the appropriate length for the vertical tensioning members 66 and utilizing the elasticity of the upright member, the members 66 are placed under tension. If desired, length adjustment of the vertical tensioning members 66 can be accomplished by means of turnbuckles or tension springs such as those shown in FIGS. 3–4 and 8, respectively. Furthermore, it should be understood that the vertical tensioning members 66 can be connected directly to the upper portions 24 of the upright members if desired.

Referring now to FIG. 2, there is shown another variation of the triangulated tension support structure 10 utilizing a variable length horizontal member indicated generally by the reference numeral 2. The horizontal member 72 is pivotally connected to the uprights 24 by pivotally mountings 74. The horizontal member 72 comprises segments **72*a*, 72*b*, 72*c*, a hinge 74 connecting segments 72*b* and 72*c* and a threaded length adjuster 76 that connects the threaded portions of segments 72*a* and 72*b***.

Given the arrangement shown in FIG. 2, if the upper tensioning member 34 and the diagonally crossed braces 30 and 32 are formed of a flexible material, they do not have to be removed from the uprights 24 so that entire structure can be collapsed by decreasing the length of horizontal member 72 and by means of rotation of threaded element 78 and then collapsing the structure by rotating the segments **72*a* and 72*b* and 72*c* about the hinge 76. It will be understood that the same structure can be used with solid tension member 30, 32 and 34 if these elements can be removed from one or both of the upright members 24**.

Looking at FIG. 3, there is shown another variation in the tension adjusting means for the triangulated tension support structure. In this case, it is placed in diagonal X-brace member 32 and secured to the lower portion 22 of upright 20 by means of an "omega"- shaped bracket 82 and threaded hook 84. The turnbuckle arrangement 80 shown in FIGS. 3 and 4 can be used in either or both diagonally crossed braces 30 and 32.

FIGS. 5 and 6 depict another variation of the triangulated tension support structure which utilizes the elasticity of at least a segment of the upper portions 24 of the upright members 20. These segments, identified as **24*a* in FIGS. 5 and 6, are bent inwardly toward each other as viewed in FIG. 5 and then locked in that position by means of the upper tensioning member 34. The length of the upper tensioning member 34 is selected to be less than the distance between the upper portion segments 24*a* prior to their being bent inwardly (as shown by the solid lines in FIG. 24). The relaxed state of the upper portion segments 24*a* is illustrated by the dashed lines in FIG. 5. FIG. 6 illustrates in detail the removable attachment of the upper tensioning member 34 shown in FIG. 5. For purposes of clarity, the upper segments 24*a* have not been shown with any degree of bending in FIG. 6. It will be appreciated that the same technique can be employed by bending the lower portions 22 of the uprights and securing the diagonally crossed tensioning members 30 and 32** thereto. Similarly, the intermediate portions of the upright members can be bound outwardly while the horizontal compression member is secured thereto.

Figure 7:
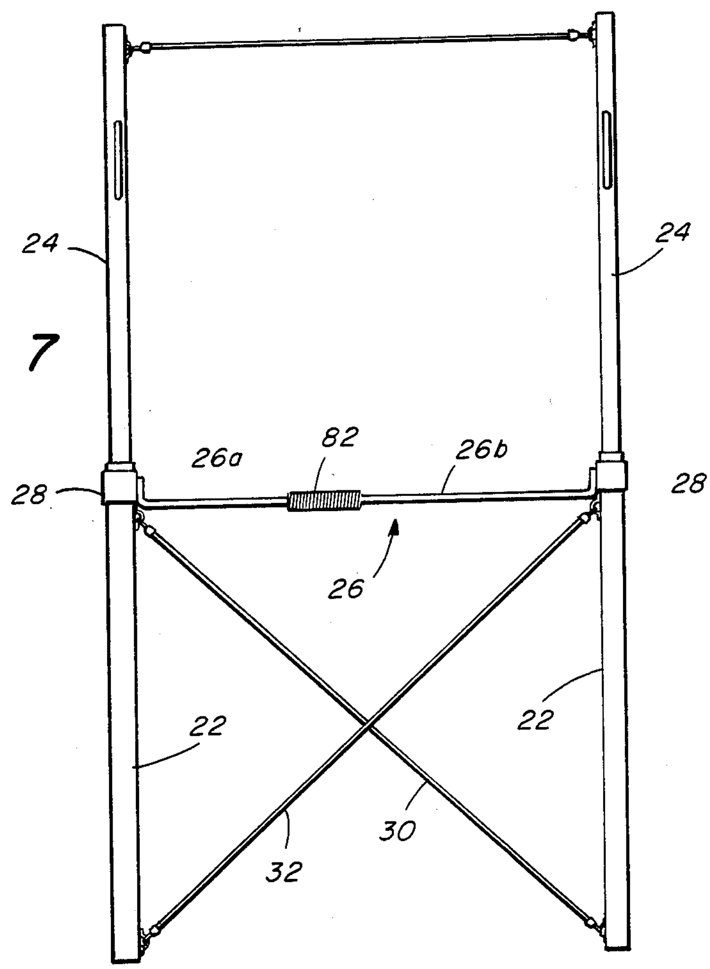
FIG. 7 is a view in front elevation showing the use of a spring-loaded compression member.
Figure 8:
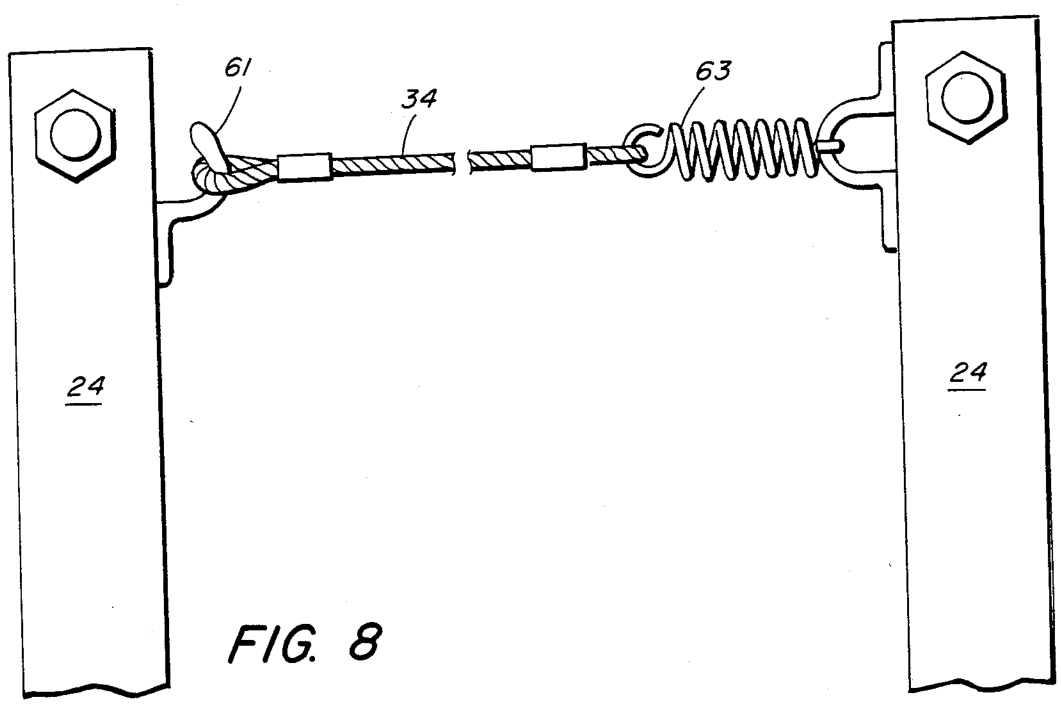
FIG. 8 is a view in front elevation showing the upper portion of the upright structure utilizing a tension spring-loaded upper tension member.

FIGS. 7 and 8 illustrate other methods of applying a force to the upright members 20. In FIG. 7, the horizontal member 26 includes a compression spring 82 located between segments **26*a* and 26*b* of the horizontal member. The compression spring 82 forces the segments 26*a* and 26*b* to the left and right as viewed in FIG. 7 thereby applying tension to the tensioning members 30, 32 and 34**.

In FIG. 8, the upper tensioning member 34 includes the previously mentioned tensioning spring 63, which exerts an inward force on both of the upright portions 24, i.e., drawing them together thereby spreading apart the X-braced diagonal tensioning members 30 and 32.

Having described in detail a preferred embodiment of our invention it will now be obvious to those skilled in the art that numerous modifications can be made therein without departing from the scope of the invention as defined in the appended claims.

What we claim and desire to secure by Letters Patent of the United States is:

1. A triangulated tension support structure comprising:

a first linear means having a base Portion, an end portion and an intermediate portion therebetween;

a second linear means having a base portion, an end portion and an intermediate portion therebetween;

a linear compression means positioned between and connected to the intermediate portion of said first and second linear means to form therewith a generally "H"-shaped planar structure and with each such connection permitting rotational movement of the corresponding linear means about a rotational axis normal to the plane of said generally "H"-shaped structure;

a first tensioning member connected between the intermediate portion of said first linear means and the base portion of said second linear means;

a second tensioning member connected between the intermediate portion of said second linear means and the base portion of said first linear means, said first and second tensioning members diagonally crossing each other in a generally "X" configuration and lying in the plane formed by said first and second linear means and said linear compression means; and, an upper tensioning member extending between and connected to the end portions of said first and second linear means;

means for adjusting the tension of at least one of said first, second and upper tensioning members whereby the tensioning produces rotation of each one of said linear means about its rotational axis thereby putting said diagonally crossed first and second tensioning members and said upper tensioning member under tension and said linear compression means under compression to produce a rigid structure without slack between and among the components thereof.

2. A triangulated tension support structure comprising:

a first upright means having a lower portion, an upper portion and an intermediate portion therebetween;

a second upright means having a lower portion, an upper portion and an intermediate portion therebetween;

a horizontal compression means positioned between and connected to the intermediate portion of each of said first and second upright means to form therewith a generally "H"-shaped planar structure and with each such connection permitting rotational movement of the corresponding upright means about a rotational axis normal to the plane of said generally "H"-shaped structure;

a first tensioning member connected between the intermediate portion of said first upright means and the lower portion of said second upright means;

a second tensioning member connected between the intermediate portion of said second upright means and the lower portion of said first upright means, said first and second tensioning members diagonally crossing each other in a generally "X" configuration and lying in the plane formed by said first and second upright means and said horizontal compression means; and, an upper tensioning member extending between and connected to the upper portions of said first and second upright means;

means for adjusting the tension of at least one of said first, second and upper tensioning members whereby the tensioning produces rotation of each one of said upright means about its rotational axis to thereby putting said diagonally crossed first and second tensioning members and said upper tensioning member under tension and said horizontal compression means under compression to produce a rigid structure without slack between and among the components thereof.

3. The triangulated tension support structure of claim 2 wherein said horizontal compression means is removably connected to said first and second upright means, said first and second tensioning members and said upper tensioning member are flexible whereby said generally H-shaped, planar structure can be collapsed so that the first and second upright means are positioned adjacent to each other.

4. The triangulated tension support structure of claim 2 wherein said horizontal compression means is collapsible and said first and second tensioning members and said upper tensioning member are flexible whereby said generally H-shaped, planar structure can be collapsed so that the first and second upright means are positioned adjacent to each other.

5. The triangulated tension support structure of claim 2 wherein said horizontal compression means comprises first and second rigid members, hinge means connecting said first and second rigid members and means for pivotally connecting said rigid member to said first and second upright means and hinged, said first and second tensioning members and said upper tensioning member are flexible whereby said generally H-shaped, planar structure can be collapsed so that the first and second upright means are positioned adjacent to each other.

6. The triangulated support structure of claim 5 wherein said horizontal compression means includes means for varying the length of at least one of said first and second rigid members.

7. A triangulated tension support structure comprising:

a first upright means having a lower portion, an upper portion and an intermediate portion therebetween;

a second upright means having a lower portion, an upper portion and an intermediate portion therebetween;

a horizontal compression means positioned between and connected to the intermediate portion of each of said first and second upright means to form therewith a generally "H"-shaped planar structure and with each such connection permitting rotational movement of the corresponding upright means about a rotational axis normal to the plane of said generally "H"-shaped structure;

a first tensioning member connected between the intermediate portion of said first upright means and the lower portion of said second upright means;

a second tensioning member connected between the intermediate portion of said second upright means and the lower portion of said first upright means, said first and second tensioning members diagonally crossing each other in a generally "X" configuration and lying in the plane formed by said first and second upright means and said horizontal compression means; and, an upper tensioning member extending between and connected to the upper portions of said first and second upright means;

means for adjusting the tension of at least one of said first and second tensioning members whereby said tensioning produces rotation of each one of said upright means about its rotational axis to spread apart the upper portions of first and second upright means thereby putting said first and second tensioning member and said upper tensioning member under tension and said horizontal compression means under compression to produce a rigid structure without slack between and among the components thereof.

8. A triangulated tension support structure comprising:

a first upright means having a lower portion, an upper portion and an intermediate portion therebetween;

a second upright means having a lower portion, an upper portion and an intermediate portion therebetween;

a horizontal compression means positioned between and connected to the intermediate portion of each of said first and second upright means to form therewith a generally "H"-shaped planar structure and with each such connection permitting rotational movement of the corresponding upright means about a rotational axis normal to the plane of said generally "H"-shaped structure;

a first tensioning member connected between the intermediate portion of said first upright means and the lower portion of said second upright means;

a second tensioning member connected between the intermediate portion of said second upright means and the lower portion of said first upright means, said first and second tensioning members diagonally crossing each other in a generally "X" configuration and lying in the plane formed by said first and second upright means and said horizontal compression means; and, an upper tensioning member extending between and connected to the upper portions of said first and second upright means;

means for adjusting the tension of said upper tensioning member whereby the tensioning of said upper tensioning member produces rotation of each one of said upright means about its rotational axis to spread apart the lower portions of first and second upright means thereby putting said upper tensining member and said first and second tensioning members under tension and said horizontal compression means under compression to produce a rigid structure without slack between and among the components thereof.

9. The triangulated structure of claims 7 or 8 wherein the tension of said upper tensioning member is adjusted and said means for adjusting the tension comprises a tension spring means.

10. The triangulated structure of claims 7 or 8 wherein the tension of said first tensioning member is adjusted and said means for adjusting the tension comprises a turnbuckle means.

11. The triangulated tension structure of claim 8 wherein said means for adjusting the tension comprises at least a segment of each of said first and second upright means upper portion that has sufficient elasticity to permit the segments to be bent inwardly toward each other and wherein the length of said upper tensioning member is less than the distance between said segments prior to their being bent inwardly toward each other.

12. triangulated tension support structure of claim 2 further comprising:

A. a first triangular leg means having an apex and a base portion, said first triangular leg means being connected to the intermediate portion of the first upright means at the apex of the triangular leg means and to the lower end of the first upright means at the base portion of the triangular leg means, said first triangular leg means lying in a plane generally normal to the plane of the generally H-shaped planar structure; and, B. a second triangular leg means having an apex and a base portion, said second triangular leg means being connected to the intermediate portion of the second upright means at the apex of the triangular leg means and to the lower end of the second upright means at the base portion of the triangular leg means, said second triangular leg means lying in a plane generally normal to the plane of the generally H-shaped planar structure.

13. The triangulated tension support structure of claim 2 further comprising:

A. a first triangular leg means having an apex and a base portion, said first triangular leg means being connected to the intermediate portion of the first upright means at the apex of the triangular leg means and to the lower end of the first upright means at the base portion of the triangular leg means, said first triangular leg means lying in a plane generally normal to the plane of the generally H-shaped planar structure;

B. a second triangular leg means having an apex and a base portion, said second triangular leg means being connected to the intermediate portion of the second upright means at the apex of the triangular leg means and to the lower end of the second upright means at the base portion of the triangular leg means, said second triangular leg means lying in a plane generally normal to the plane of the generally H-shaped planar structure;

C. a vertical tensioning member connected to and extending between the first triangular leg means and the upper portion of said first upright means; and D. a vertical tensioning member connected to and extending between the second triangular leg means and the upper portion of said second upright means.

14. The triangulated tension support structure of claim 2 further comprising:

A. a first triangular leg means having an apex and a base portion, said first triangular leg means being connected to the intermediate portion of the first upright means at the apex of the triangular leg means and to the lower end of the first upright means at the base portion of the triangular leg means, said first triangular leg means lying in a plane generally normal to the plane of the generally H-shaped plana structure;

B. a second triangular leg means having an apex and a base portion, said second triangular leg means being connected to the intermediate portion of the second upright means at the apex of the triangular leg means and to the lower end of the second upright means at the base portion of the triangular leg means, said second triangular leg means lying in a plane generally normal to the plane of the generally H-shaped planar structure;

C. at least one support means connected to and extending outwardly from each one of said upright means;

D. a vertical tensioning member connected to and extending between the first triangular leg means and the support means on said first upright means; and, E. a vertical tensioning member connected to and extending between the second triangular leg means and the support means on said second upright means.

15. The triangulated tension structure of claim 7 wherein said means for adjusting the tension comprises at least a segment of each or said first and second upright means lower portion that has sufficient elasticity to permit the segments to be bent inwardly toward each other and wherein the length of at least one of said first and second tensioning members is less than the distance between their connection points prior to the segments being bent inwardly toward each other.

16. The triangulated tension support structure of claim 2 wherein said horizontal compression member includes a compression spring means.

* * * * *